Figure 1:
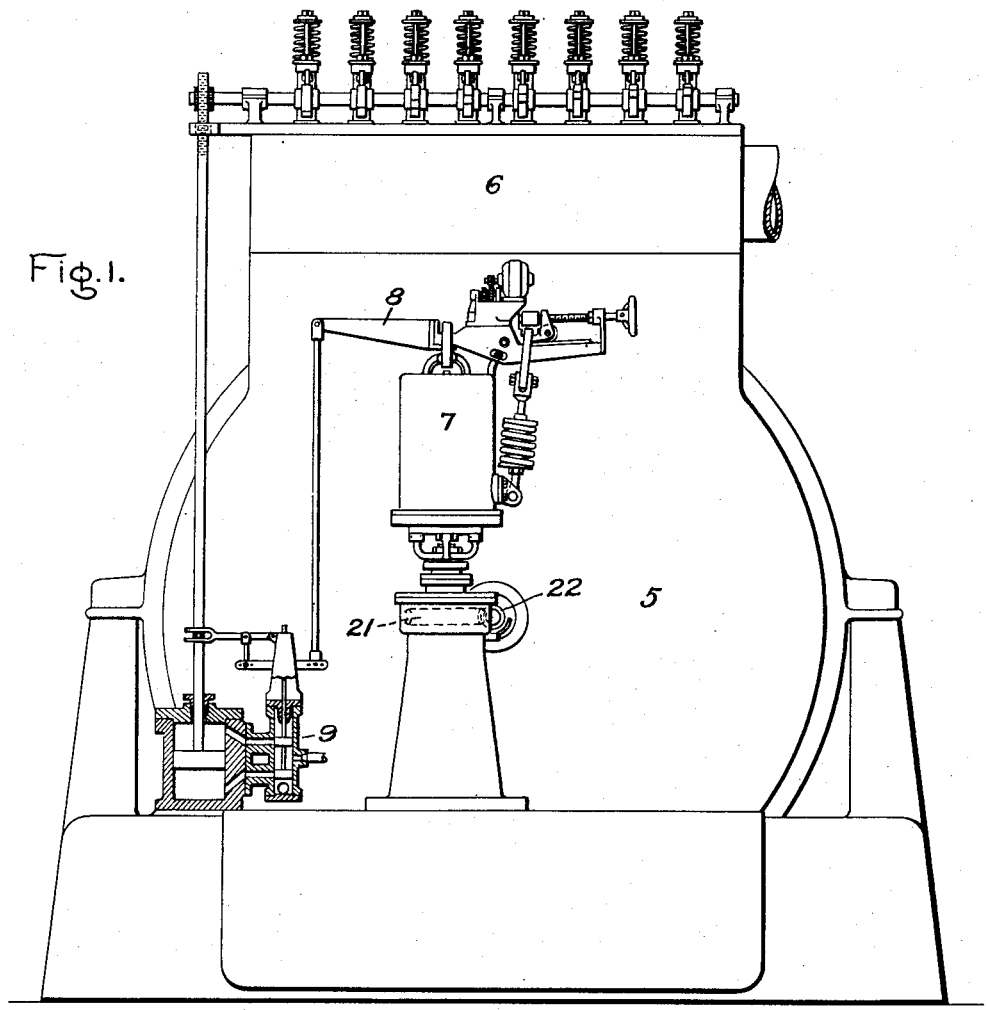

Aug. 25, 1925.

W. P. DRYER 1,551,375

SPEED GOVERNOR FOR PRIME MOVERS

Filed May 10, 1922 2 Sheets-Sheet 1

Inventor:
William P. Dryer,
by [signature]
His Attorney.

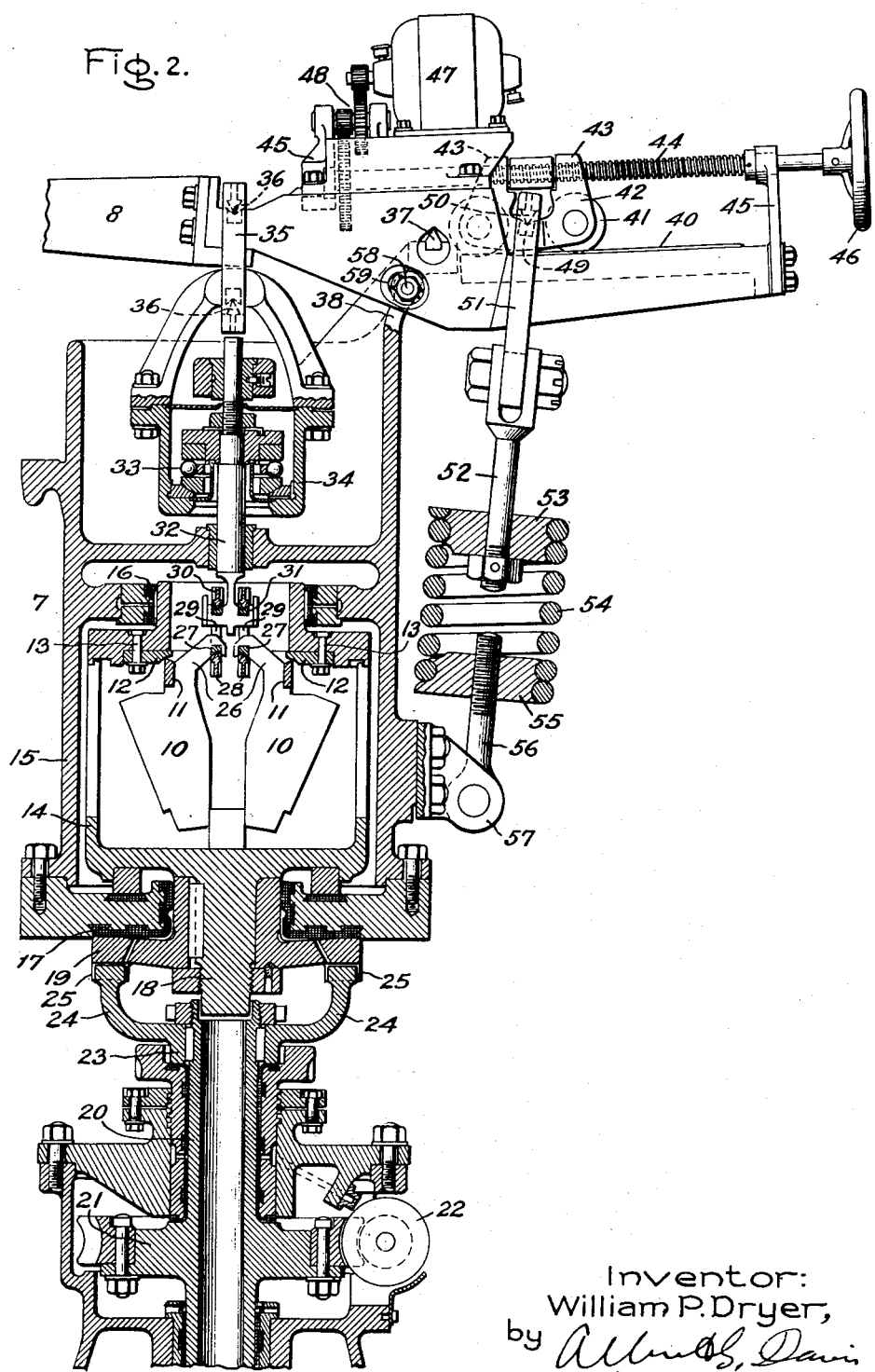

Patented Aug. 25, 1925.

1,551,375

UNITED STATES PATENT OFFICE.

WILLIAM POOLE DRYER, OF SCHENECTADY, NEW YORK, ASSIGNOR TO GENERAL ELECTRIC COMPANY, A CORPORATION OF NEW YORK.

SPEED GOVERNOR FOR PRIME MOVERS.

Application filed May 10, 1922. Serial No. 559,938.

*To all whom it may concern:*

Be it known that I, WILLIAM POOLE DRYER, a subject of the British Empire, residing at Schenectady, county of Schenectady, State of New York, have invented certain new and useful Improvements in Speed Governors for Prime Movers, of which the following is a specification.

The present invention relates to speed governors for prime movers such as elastic fluid turbines for example, and has for its object to provide an improved governor which will give close regulation over a wide range in speed.

For a consideration of what I believe to be novel and my invention, attention is directed to the accompanying description and the claims appended thereto.

In the drawing, Fig. 1 is a diagrammatic end view of an elastic fluid turbine equipped with a speed governor embodying my invention, and Fig. 2 is a side elevation partly in section of the governor.

Referring to the drawing, 5 indicates an elastic fluid turbine provided with a valve mechanism 6 for controlling the flow of elastic fluid to the turbine. As is well understood, the valve mechanism is opened and closed to increase and decrease the flow of elastic fluid to the turbine in accordance with the load, the valve mechanism being actuated directly or indirectly from a speed governor driven by the turbine. In the present instance, 7 indicates a speed governor, and 8 the governor lever which is connected to the valve mechanism through the intermediary of a servo-motor 9, the connections including a usual form of follow-up device to prevent overtravel of the governor. The form of valve mechanism illustrated and the connections to the governor lever including the servo-motor are shown only by way of example and may be taken as typical of any suitable arrangement.

Referring now to Fig. 2, the governor weights 10 are provided with knife edges 11 which are fulcrumed on blocks 12 fastened by bolts 13 to the top plate of a revolving cage 14. Cage 14 is located in a fixed governor casing 15 provided with upper and lower bearings 16 and 17. Lower bearing 17 forms a support for cage 14 and holds it against axial movement. On the lower end of cage 14 is a stub shaft 18 to which is keyed a thrust collar 19 which engages bearing 17. Cage 14 is driven by a shaft 20 on which is a worm wheel 21 which meshes with a worm 22 on the turbine shaft. Shaft 20 is connected to cage 14 by a spider 23 which is fixed to the upper end of the shaft and has arms 24 which engage lugs 25 on the under side of thrust collar 19.

Governor weights 10 are provided with arms 26 having bearing blocks 27 which engage knife edge bearings 28 carried by links 29. Links 29 have knife edges 30 by means of which they are hung on bearing blocks 31 carried by the lower end of a short shaft 32. Shaft 32 is hung on a ball bearing 33 in a bearing cage 34 which in turn is hung on governor lever 8 by a link 35, knife edge bearings 36 being provided in each case. Governor lever 8 is fulcrumed on a knife edge 37 fixed on a bracket arm 38 carried by casing 15.

Governor lever 8 is provided with a track 40 on which run the wheels 41 of a carriage 42. Carriage 42 has two arms 43 provided with threaded openings through which a threaded rod 44 extends. Rod 44 is mounted in suitable bearings 45 carried by governor lever 8 and has a hand wheel 46 at its outer end for turning it. Rod 44 is arranged to be turned also by a motor 47 mounted on governor lever 8 about over its fulcrum and connected to rod 44 by gearing 48. The motor is arranged to be operated in either direction and as is obvious when operated in one direction it will turn rod 44 in a direction to move carriage 42 toward the right and when operated in the other direction it will turn rod 44 in a direction to move carriage 42 toward the left. On carriage 42 is a knife edge seat 49 with which engages a knife edge 50 carried by a link 51. The lower end of link 51 is connected to a clevis fixed to a spring plug 53 in one end of a governor spring 54. The other end of governor spring 54 is provided with a spring plug 55 connected by an eye bolt 56 to a bracket 57 on the side of governor casing 15. At 58 is a stop pin which is carried by bracket arm 38 and passes loosely through an elongated hole 59 in governor lever 8. This forms a stop means to limit the tilting movements of governor lever 8 on knife edge pivot 37.

In operation the centrifugal action of governor weights 10 pulling down on the left hand end of governor lever 8 is opposed by spring 54 which serves the function of the usual governor spring. With increase in speed the governor weights fly outward thus pulling down on shaft 32 which lowers the left hand end of lever 8. This moves the pilot valve of the servo-motor in a direction to effect a closing movement of the valve gear 6 so as to cut down the amount of elastic fluid admitted to the turbine. With decrease in speed the centrifugal action of weights 10 decreases so that spring 54 pulls down the right hand end of governor lever 8 thus raising the left hand end to effect an increase in the admission of motive fluid to the turbine. The operation of a speed governor of this general type is of course well understood and needs no detail description.

To change or adjust the setting of the governor, carriage 42 is moved along track 40 to vary the length of the lever arm through which spring 54 acts and also to vary to some extent the initial tension of spring 54. Variation in the tension of spring 54 occurs because track 40 does not follow the arc of a circle having the pivot of eye bolt 56 as its center but on the contrary is tangent to such a circle. For example, movement of carriage 42 toward the right in Fig. 2 increases the length of the lever arm through which spring 54 acts by increasing the distance between fulcrum 37 and pivot point connection 50 and at the same time it increases to some extent the initial tension of spring 54. Thus it will be seen that in adjusting the setting of the governor I vary the length of the lever arm and the tension of spring 54. The amount of the change due to each of these causes depends of course on the direction which track 40 takes. If track 40 were curved with the pivot of eye bolt 56 at its center, the tension of spring 54 would remain the same for all governor settings, and this arrangement would give the closest regulation at all speeds. However, from a commercial standpoint, such an arrangement, while it is practical for a governor intended for regulation over a small speed range, is not so desirable for a governor of large speed range due to the length of lever required. For this reason, for a long range governor as illustrated in the drawing while I change the setting of the governor primarily by adjusting the length of the lever arm I make a part of the adjustment by varying the tension of the spring so as to avoid the necessity of too long a governor lever.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is,—

1. The combination with a prime mover having a valve gear, of a governor comprising a lever operatively connected with the valve gear to control the same, a fixed fulcrum for the lever, speed responsive means and opposing spring means connected to said lever, one of said connections including a carriage adjustable along the lever, and a motor mounted directly on and carried by the lever for moving said carriage along the lever to vary the setting of the governor.

2. In a speed governor, the combination of a supporting structure, a governor lever, means providing a fixed fulcrum on the supporting structure for the governor lever, governor weights connected to said lever on one side of the fulcrum, a track on the lever at the other side of the fulcrum, a carriage on the track, a governor spring having one end connected to the carriage and the other end fixed, a motor mounted directly on and carried by the lever, and means connecting the motor to the carriage for moving the carriage along the track.

3. The combination with a prime mover having a valve gear, of a governor comprising a lever operatively connected with the valve gear to control the same, a stationary fulcrum for the lever, speed responsive means connected to said lever, means forming a track on the lever, a carriage movable along the track, a governor spring, a stationary member, means pivotally connecting one end of the governor spring to the stationary member, means pivotally connecting the other end of the governor spring to said carriage, an electric motor mounted directly on said governor lever, and means connecting the motor to the carriage whereby the motor may be operated to move the carriage along the track.

4. The combination with a prime mover having a valve gear, of a governor comprising a lever operatively connected with the valve gear to control the same, a stationary fulcrum for the lever, speed-responsive means connected to said lever, means forming a plane track along the lever adjacent one end, a carriage movable along the track, a governor spring, a stationary member, means pivotally connecting one end of the governor spring to the stationary member, said means being located at a certain distance from the end of the lever on which the carriage moves, which distance is greater than that between said means and the fulcrum, means pivotally connecting the other end of the governor spring to said carriage, an electric motor mounted directly on said governor lever, and means connecting the motor to the carriage whereby the motor may be operated to move the carriage along the track.

5. The combination with a prime mover having a valve gear by which its operation is controlled, of an operating governor for the prime mover, comprising a fixed governor casing, a revolving cage journaled in the casing, governor weights pivotally carried by the cage, means forming a driving connection between the cage and the prime mover, a governor lever pivotally connected with the governor weights, means providing a fixed fulcrum on the casing for the governor lever on which fulcrum said lever moves in response to movement of the governor weights, means providing an operating connection between the governor lever and the valve gear, the governor weights and said last-named means being connected with the governor lever in fixed spaced relation to the fulcrum, a motor mounted directly over the fulcrum, a movable carriage mounted on the governor lever, means carried by the governor lever and connected with said carriage for moving the latter along the lever adjacent one end thereof toward and away from the fulcrum, said means being connected with the motor to be operated thereby, a governor spring pivotally connected at one end with the carriage, and means providing a pivotal connection for the other end of the governor spring on the casing at a point in the plane of the lever more remote from the end of the lever on which the carriage moves than from the fulcrum, whereby the governor spring is increased in tension when the carriage is moved away from the fulcrum.

In witness whereof, I have hereunto set my hand this 9th day of May 1922.

WILLIAM POOLE DRYER.